United States Patent
O'Hora et al.

(10) Patent No.: US 7,583,222 B2
(45) Date of Patent: Sep. 1, 2009

(54) METHOD FOR USING PULSE COMPRESSION IN WEATHER RADAR

(75) Inventors: Fritz O'Hora, Pepperell, MA (US); Richard E. Passarelli, Jr., Groton, MA (US); Alan D. Siggia, Acton, MA (US); Chandrasekaran Venkatachalam, Fort Collins, CO (US); Nitin Bharadwaj, Fort Collins, CO (US)

(73) Assignee: Vaisala Oyj, Helsinki (FI)

( * ) Notice: Subject to any disclaimer, the term of this patent is extended or adjusted under 35 U.S.C. 154(b) by 223 days.

(21) Appl. No.: 11/510,060

(22) Filed: Aug. 25, 2006

(65) Prior Publication Data
US 2007/0046526 A1 Mar. 1, 2007

Related U.S. Application Data

(60) Provisional application No. 60/711,619, filed on Aug. 26, 2005.

(51) Int. Cl.
G01S 13/00 (2006.01)
G01S 13/04 (2006.01)

(52) U.S. Cl. ............... 342/26 R; 342/26 A; 342/26 B; 342/26 C; 342/26 D; 342/104; 342/159; 342/176; 342/192

(58) Field of Classification Search ............... 342/26 R, 342/26 A, 26 B, 26 C, 26 D, 159, 175, 196, 342/104, 176, 192
See application file for complete search history.

(56) References Cited

U.S. PATENT DOCUMENTS

| | | | |
|---|---|---|---|
| 3,610,901 A | 10/1971 | Lynch | |
| 4,589,070 A | 5/1986 | Kyrazis | |
| 4,622,552 A | 11/1986 | Andrews et al. | |
| 5,140,332 A | 8/1992 | Martin et al. | |
| 5,357,256 A | 10/1994 | Peperone | |
| 5,500,646 A | 3/1996 | Zrnic | |
| 5,808,580 A * | 9/1998 | Andrews, Jr. | ............... 342/162 |

(Continued)

FOREIGN PATENT DOCUMENTS

EP 0 051 361 5/1982

(Continued)

OTHER PUBLICATIONS

Mismatched compression filter for improved radar range resolution Zejak, A.J.; Simic, I.S.; Golubicic, Z.T.; Petrovic, A.; Electronics, Circuits and Systems, 1999. Proceedings of ICECS '99. The 6th IEEE International Conference on vol. 2, Sep. 5-8, 1999 pp. 733-736 vol. 2.*

(Continued)

*Primary Examiner*—Thomas H Tarcza
*Assistant Examiner*—Peter M Bythrow
(74) *Attorney, Agent, or Firm*—Edwards Angell Palmer & Dodge LLP; David G. Conlin; George N. Chaclas (57) ABSTRACT

A system and method for processing data related to weather phenomena in a meteorological radar system. The method includes receiving an echo signal generated by transmitting a long pulse and employing a mismatched windowed filter on the echo signal such that the echo signal is compressed in time to achieve fine range resolution without substantially degrading sensitivity and while achieving low range time side lobes for Doppler velocities expected to be measured by the meteorological radar system.

21 Claims, 7 Drawing Sheets

U.S. PATENT DOCUMENTS

| | | | |
|---|---|---|---|
| 6,803,875 | B1 | 10/2004 | Alford et al. |
| 6,803,876 | B2 | 10/2004 | Erkocevic-Pribic et al. |
| 6,859,163 | B2 | 2/2005 | Alford et al. |
| 7,049,997 | B2 | 5/2006 | Alford et al. |
| 2004/0056791 | A1 | 3/2004 | Alford et al. |

FOREIGN PATENT DOCUMENTS

| | | |
|---|---|---|
| EP | 0 061 941 | 10/1982 |
| EP | 0 064 305 | 11/1982 |
| EP | 0 184 424 | 6/1986 |
| EP | 1369703 | 12/2003 |
| WO | WO-2006/123084 | 11/2006 |

OTHER PUBLICATIONS

Optimum Mismatched Filters for Sidelobe Suppression Ackroyd, M.H.; Ghani, F.; Aerospace and Electronic Systems, IEEE Transactions on vol. AES-9, Issue 2, Mar. 1973 pp. 214-218.*

Coherent multiple-frequency chirp exciter for L band radars Sawicki, Z.; Microwaves, Radar and Wireless Communications, 2004. Mikon-2004. 15th International Conference on vol. 3, May 17-19, 2004 pp. 928-931 vol. 3.*

Computer simulation for pulse compression performance analysis Torok, I.; Seller, R.; Microwaves and Radar, 1998. Mikon '98., 12th International Conference on vol. 3, May 20-22, 1998 pp. 795-798 vol. 3.*

Keeler, "A Brief Survey of Antenna Mounted Receivers for Weather Radar", r-J-K Consulting, LLC, Boulder, CO, Sep. 27, 2004.

Schroth, et al, "A C-Band Coherent Polarimetric Radar for Propagation and Cloud Physics Research", *1988 American Meterological Society*, Dec. 1988, pp. 803-822.

Leonadi, et al, Polar 55C: A C-Band Advanced Meteorological Radar Developed for C.N.R., Italy; American Meteorological Society, Conference Volume: 22nd Conference on Radar Meteorology, Sep. 10-13, 1984, pp. 238-243.

Doviak, et al, "Considerations for Polarmetric Upgrades to Operational WSR-88D Radars"; Journal of Atmospheric and Oceanic Technology, Mar. 2000, vol. 7, pp. 257-278.

Enterprise Electronics Corp., Statement of Work and Cost Proposal P1038-81/82 for Deutsche Forschungs Und Versuchsanstaslt Fuer Luet Und Raumfahrt E.V., Aug. 1982, pp. 1-31.

Doviak, et al, Polarimetric Upgrades to Improve Rainfall Measurements; National Severe Storms Laboratory Report, Apr. 1998, pp. 1-110.

Hendry, et al, Application of Waveguide Switching in Dual-Channel Polarization Diversity Radar, and Preliminary Results, pp. 352-357.

Keenan, "The BMRC/NCAR C-Band Polarmetric (C-POL) Radar System"; American Meteorological Society, Aug. 1998, pp. 871-886.

Meischner, "Advanced Weather Radar Systems in Europe: the Cost 75 Action"; Bulletin of the American Meteorological Society, vol. 78, No. 7, Jul. 1997, pp. 1411-1430.

Whiton, et al, "History of Operational Use of Weather Radar by U.S. Weather Services. Part I: The Pre-NEXRAD Era"; American Meterological Society, Weather & Forcasting, vol. 13, Issue 2 (Jun. 1998), pp. 219-243.

Ginn, "From PPI to Dual Doppler Images"; Hong Kong Observatory, Presented at the 32nd Session of the ESCAP/WMO Typhoon Committee, Seoul, Republic of Korea, Nov. 23-29, 1999.

Joe, et al, "Evolution of the Canadian Operational Radar Network"; Proceedings of ERAD (2002), pp. 370-382.

Wurman, :Design and Deployment of a Portable, Pencil-Beam, Pulsed, 3-cm Doppler Radar; American Meteorological Society, Journal of Atmospheric and Oceanic Technology, vol. 14, Issue 6, 1997, pp. 1502-1512.

Bringi, et al, "Chapter 19a—Technology of Polarization Diversity Radars for Meteorology"; pp. 153-190.

Siggia, et al, "Gaussian model adaptive processing (GMAP) for improved ground clutter cancellation and moment calculation"; Proceedings of ERAD (2004), pp. 67-73.

Dixon, et al, "Echo Classification and Spectral Processing for the Discrimination of Clutter from Weather"; paper submitted to AMS 32nd Conference on Radar Meteorology, Albequerque, New Mexico, USA, Oct. 2005, pp. 1-10.

Cho, et al, "Multi-PRI Signal Processing for the Terminal Doppler Weather Radar, Part I: Clutter Filtering"; Journal of Atmospheric and Oceanic Technology, vol. 22, May 2005, pp. 575-582.

Chrisman, et al, "A First Look at the Operational (Data Quality) Improvements Provided by the Open Radar Data Acquisition (ORDA) System".

Torres, et al, "Signal Design and Processing Techniques for WSR-88D Ambiguity Resolution, Part 8: Phase Coding and Staggered PRT Data collection, implementation, and clutter filtering"; a National Severe Storms Loaboratory Report, Nov. 2004, National Oceanic and Atmospheric Administration (NOAA), National Severe Storms Loaboratory, Norman, OK.

Bech, et al, "The weather radar network of the Catalan Meteorological Service: description and applications"; *Proceedings of ERAD* (2004), pp. 416-420.

Bucci, et al, "An Experiment with an S-Band Radar Using Pulse Compression and Range Sidelobe Suppression for Meteorological Measurements"; *1994 IEEE National Radar Conference*, pp. 35-40.

Urkowitz, et al, "Doppler Tolerant Range Sidelobe Suppression in Pulse Compression Meteorological Radar", *Proceedings IGRSS '92*, Houston, TX, May 26-29, 1992, vol. No. I, pp. 206-208.

Keeler, et al, "Pulse Compression for Weather Radar", *1995 IEEE International Radar Conference*, pp. 529-535.

National Severe Storms Laboratory, 1999 Informal Publications by NSSL and CIMMS Scientists.

Brandes, "Dual-Polarization Radar Fundamentals and Algorithm Prospects", *National Center for Atmospheric Research, Research Applications Program*, Boulder, CO, May 12, 2000.

Schroth, et al, "A C-Band Coherent Polarimetric Radar for Propagation and Cloud Physics Research", *American Meteorological Society*, May 21, 1988, pp. 803-822.

Chandrasekar, et al, "Antenna Pattern Analysis and Measurements for Multiparameter Radars," *Journal of Atmospheric and Oceanic Technology*, vol. 10, No. 5, Oct. 1993, pp. 674-683.

Schiff, et al, "Details of the Production Model AN/CS-9 Storm Detector Radar", *Allerton Estate*, Oct. 1, 1951, pp. 221-225.

Keeler, et al, "S-Pol: NCAR's Polarimetric Doppler Research Radar", *IGARRS-2000*, Honolulu, Hawaii, Jul. 24-28, 2000, pp. 1-4.

Keeler, et al, "Description of NCAR/FOF CP-2 Meteorological Doppler Radar", *Volume of the 24th Conference on Radar Meteorology*, Mar. 27-31, 1989, Tallahassee, Florida, pp. 589-592.

Schroth, et al, "Coherent Polarimetrc C-Band Radar for Atomspheric Research", *Proceedings of IGRSS '84 Symposium, Strasbourg* Aug. 27-30, 1984, pp. 497-505.

Schroth, et al, "Technical Concept of the Planned Agile Coherent Polarization-Diversity Radar for the DFVLR", *DFVLR, FB-NE, 8031 Oberpfaffenhofen, FGR, Bournemouth 1982*, pp. 67-69.

* cited by examiner

METHOD FOR USING PULSE COMPRESSION IN WEATHER RADAR

CROSS-REFERENCE TO RELATED APPLICATION

This application claims the benefit of Provisional Application Ser. No. 60/711,619 filed on Aug. 26, 2005, which is incorporated herein by reference.

BACKGROUND OF THE INVENTION

1. Field of the Invention

The subject disclosure relates to methods and systems for weather radar signal processing, and more particularly to improved methods and systems for high sensitivity, fine range resolution and adequate suppression of Integrated Side Lobe (ISL) and Peak Side Lobe (PSL) in meteorological radar imagery.

2. Background of the Related Art

The modern explosion in wireless communication such as cell phones, wireless networks, and other broadcasts has created competition for frequency allocations and the potential for interference. Avoidance of interference from one system to another has created tight tolerances and a need to stay within an allocated range. As a result, longstanding applications like meteorological radar are being constrained to improve control over the emission of frequencies and peak power levels.

Historically, in the scope of meteorological radar, systems have been demonstrated that utilize pulse compression techniques, but such systems produced poor results. The constraints of technology and/or economics have further prevented operationally realizing a commercial system. Specifically, in the past, systems employing pulse compression techniques have shown poor results in obtaining ISL values sufficiently suppressed for practical use in meteorological radar over the range of target Doppler velocities expected to be measured by meteorological radar. High suppression of ISL values is not required in some other non-meteorological radar applications, but is particularly critical for meteorological radar. The high suppression of ISL is required because the targets measured in meteorological radar often span many cubic kilometers of area as opposed to point targets such as aircraft or missiles measured by other types of radar systems. The result of these past implementations was high ISL values that blurred the meteorological images. Thus, false readings, irresolvable echoes, breakthrough of ground clutter and other image contaminants rendered such techniques as poor options.

SUMMARY OF THE INVENTION

It is an object of the subject disclosure to achieve range resolution of short pulses with the greater sensitivity of long pulses by using pulse compression in radar. Preferably, the high sensitivity, fine range resolution and/or adequate ISL and PSL suppression is both practical and economical resulting in high quality meteorological radar imagery.

It is an object of the subject disclosure to reduce the range time sidelobes to acceptable values and to provide Doppler tolerance. The subject technology uses frequency modulation instead of previously researched and documented techniques. In one embodiment, the system performs amplitude shaping of the pulse such that the amplitude is run from zero to near maximum using a cosine, cosine squared, or higher order edge taping function, and the inverse on the trail of the pulse.

It is another aspect of the subject technology to further reduce range time sidelobes and enhance Doppler tolerance by using a weighted window function in a digital receiver of the radar system. In more traditional pulse compression systems, a filter that is the matched to the pulse is used. With the subject technology, it is realized that a mismatched filter can be used where the mismatch is a weighting such as a hamming window. Such a mismatch causes a small reduction in sensitivity, but this is traded off to provide the high range time sidelobe suppression level in the Doppler velocity spectrum expected of meteorological targets, thus being Doppler Tolerant. Such a tradeoff is very practical for meteorological radar and other systems.

The present disclosure is directed to a method for using a signal processing technique in weather radar, wherein by arranging the characteristics of the signal processing related parameters involved in transmit waveform and receive window design, high quality data can be obtained over the full range of Doppler velocities that a meteorological radar is expected to measure. And in a further aspect, by placing pre-emphasis on the transmitted pulse and by including a realtime waveform design and analysis utility directly in the signal processor, results are realizable very practically.

The present disclosure is also directed to a method for processing data related to weather phenomena in a meteorological radar system. The method includes receiving an echo signal generated by transmitting a long pulse and employing a mismatched windowed filter on the echo signal such that the echo signal is compressed in time to achieve fine range resolution without substantially degrading sensitivity and while achieving low range time side lobes for Doppler velocities expected to be measured by the meteorological radar system.

Still another embodiment of the present disclosure is a method for processing data related to weather phenomena in a meteorological radar system having an antenna connected to a transmitter, wherein the transmitter is connected to a signal processor, which is connected to a receiver. The method includes the steps of generating long pulses at IF in the signal processor with amplitude shaping and frequency modulation, using an exciter to up convert the long pulses to RF. A linear power amplifier style transmitter in the signal processor produces high power output from the low power input from the exciter such that the pulses are radiated into space. The echoes are received using the antenna and a mismatched windowed filter is employed on the echoes such that the echoes are compressed in time to achieve fine range resolution without substantially degrading sensitivity and while achieving low range time side lobes for Doppler velocities expected to be measured by the meteorological radar system.

And yet another embodiment of the present invention includes a radar system including an antenna, a transmitter for providing a pulse signal to the antenna, a signal processor having a waveform design utility that accepts input criteria from a user such as desired pulse width, bandwidth, modulation and shaping to create the pulse signal from a constrained space of pulse signals and a receiver connected to the signal processor.

It should be appreciated that the present invention can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

The present invention overcomes many of the prior art problems associated with radar performance when using long compressed pulses, especially with meteorological radar. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Unless otherwise specified, the illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology. All relative descriptions herein such as top, bottom, left, right, up, and down are with reference to the Figures, and not meant in a limiting sense.

The System

Figure 1:
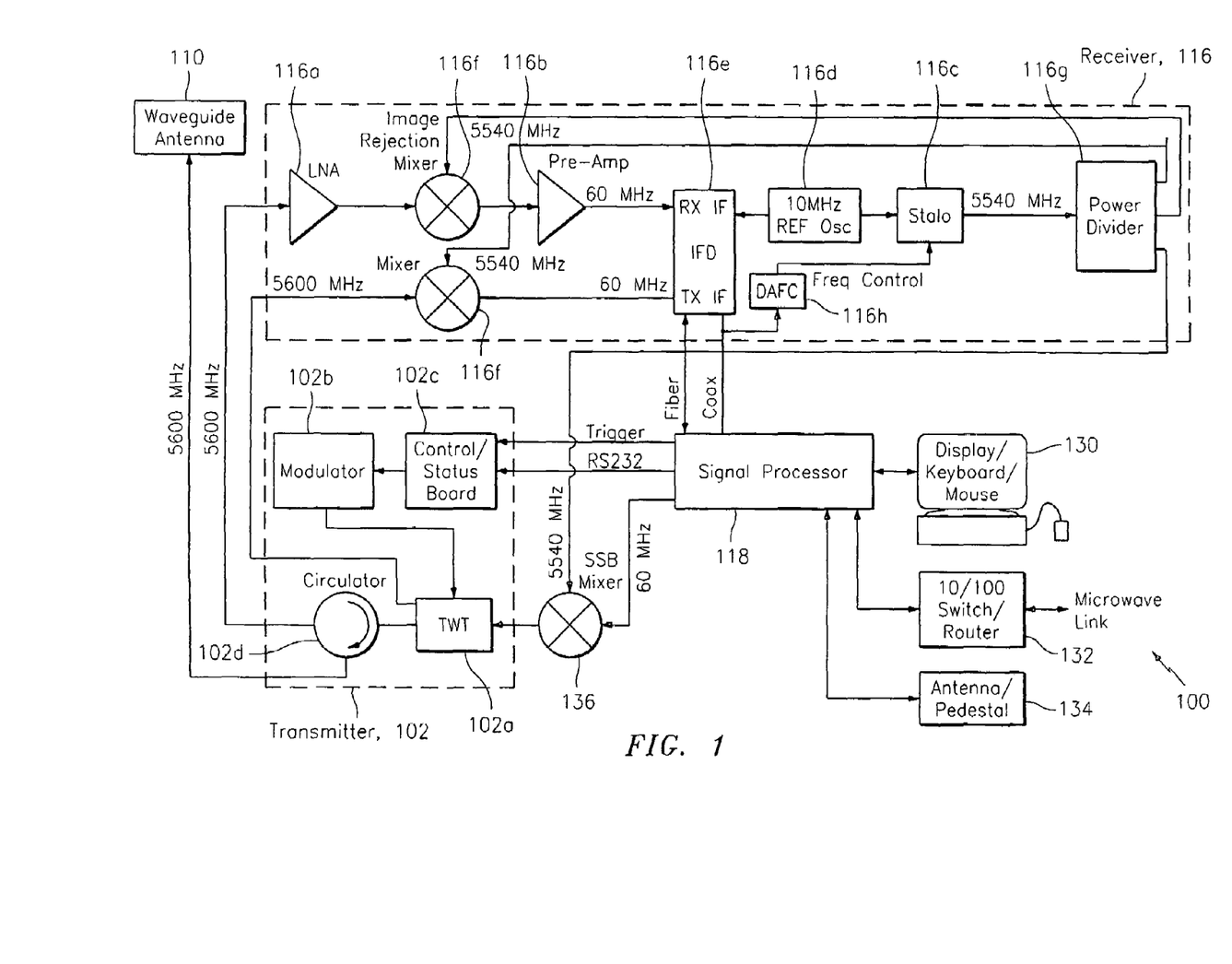
FIG. 1 is a block diagram of a pulse compression meteorological radar in accordance with the subject disclosure.

Referring now to FIG. 1, a Doppler weather radar system is shown and referred to generally by the reference numeral 100. It is noted that the same basic block diagram would also apply to a wind profiler system, missile system, aircraft control system and other systems as would be appreciated by those of ordinary skill in the pertinent art. The radar system 100 utilizes a linear amplifier type transmitter 102 connected to a waveguide/pencil beam antenna 110. A digital IF receiver/exciter 116 and a signal processor 118 process the signal. The system 100 is capable of providing high coherency, superior side lobe characteristics and broad dynamic range, narrow range resolution and great sensitivity. By using pulse compression in the signal processing, further gains in sensitivity through narrow filters are achieved.

The Transmitter

The transmitter 102 amplifies a waveform up converted from the radar intermediate frequency as generated the signal processor 118. By generating the original waveform in the signal processor 118, amplitude and/or frequency modulation is purposefully introduced by a modulator 102b to support various processing techniques upon echo reception.

The transmitter 102 uses coherent linear amplifiers 102a of various types to produce high power output from a low power input. Practical examples of linear power amplifier transmitters 102 that can be used for a meteorological radar system 100 include types based on a Traveling Wave Tube (TWT) such as shown in the embodiment of FIG. 1, Klystron, or solid-state transistors as the final stage-amplifying element. The transmitter 102 also has a control/status board for providing information visually and a circulator 102d for isolating the transmitter 102.

Preferably, although the peak power of the transmitter 102 is limited, average power similar to more conventional non-coherent magnetron based transmitters can be achieved to support similar sensitivity. By using pulse compression in the signal processing, further gains in sensitivity through narrow filters are achieved as described hereinbelow. The signal processing also restores the range resolution to corresponding sub-microsecond values. By being low peak power, the transmitter 102 is relatively small and easily maintained and is more accepted and licensable given modern constraints on frequency and power allocations.

The Antenna

The preferred antenna 10 uses a pedestal/antenna subsystem with pencil beam coupled with a waveguide. Such an antenna 110 provides for a beam pattern that is practical for meteorological radar observations. It is appreciated by those of ordinary skill in that a variety of antennae, now known and later developed, are well-suited to utilization with the subject technology.

The Receiver

The receiver 116 interfaces with the signal processor 118 such that the signal processor 118, through an intermediate frequency digitizer (IFD) 116e, samples the IF receive signal and an IF transmit signal sample. The transmit sample is used as a phase reference for performing Doppler processing. The output of the signal processor 118 is digital radar base data (Z, V, W, and the like as is well known to those of ordinary skill in the pertinent art), which are displayable on the local radar display computer 130 and also can be sent over a network (not shown) to other radar computers. Control of the system(s) 100 can be performed by the local computer 130, or from stations connected to the network.

In one embodiment, the receiver 116 has a low noise, high dynamic range linear design RF portion 116a with a down conversion stage 116b. As a result, there is no need for gain control circuitry, which eliminates a source of phase noise. Thus, the system 100 provides higher quality data and superior clutter rejection.

To further minimize phase noise, the system 100 uses a digital Stable Local Oscillator (STALO) 116c. Digital STALOs 116c are frequency synthesizers that use a phase lock loop (PLL) to produce RF by multiplying up a base oscillator 116d of, for example, 10 MHz. The same 10 MHz signal is also connected directly to the signal processor 118 so the trigger and sampling timing is synchronous with the 10 MHz base oscillator 116d, which further enhances the coherency of the radar system 100. The receiver 116 also employs well-known mixers 116f, a power divider 116g and a frequency converter 116h as would be appreciated by those of ordinary skill in the pertinent art and, therefore, not discussed here in any detail. Similarly, the system 100 also uses a mixer 136, which is not further discussed herein.

Signal Processor

The radar system 100 has a fast digital signal processor 118 that specifically allows for interactive pulse compression waveform design and the ability to transmit, filter, receive and process said waveforms. Preferably, the signal processor 118 uses a compressed pulse of at least 16 dB lower peak power as compared to a non-compressed pulse, while realizing the same or better sensitivity and obtaining the same or better range resolution. Furthermore, the radar system obtains peak sidelobe levels of −60 dBc and integrated sidelobe levels of −50 dBc or better for targets of Doppler velocities of up to 50 m/s (which includes such targets typically measured by a meteorological radar). The signal processor 118 also outputs a pulsed IF signal that is ultimately up converted to RF by the receiver 116 and radiated by the transmitter 102.

Figure 2:
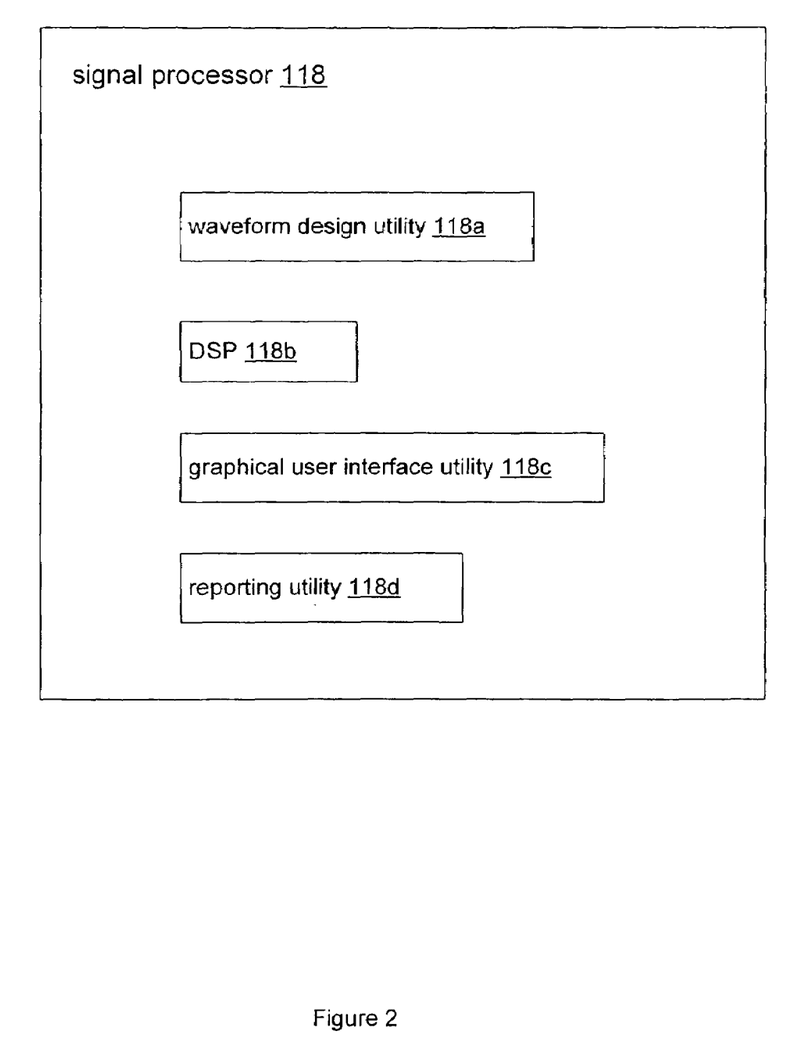
FIG. 2 is a block diagram of a signal processor in accordance with the subject disclosure.

Referring now to FIG. 2, a schematic illustration of the signal processor 118 is shown. The signal processor 118 includes a waveform design utility 118a that accepts input criteria from the user such as desired pulse width, bandwidth, modulation and shaping. Preferably, in realtime the waveform design utility 118a computes an optimal waveform and windowing filter to meet the user criteria while minimizing PSL and ISL value, providing Doppler tolerance, fine range resolution and high sensitivity. In one embodiment, the waveform design utility 118a provides the user with the ability to adjust the slope of the frequency modulation at distinct times of the pulse and to shape the amplitude tapering on the edges of the pulse. Given constraints on the above parameters input by the user, the utility then practices an algorithm that searches the constrained waveform space and provides the waveform and windowed filter given these constraints that best minimizes the values of ISL and PSL by a logarithmic addition of these two quantities.

Once the waveform is designed by the waveform design utility 118a, the waveform is automatically loaded into a digital signal processor 118b for transmission by the linear power amplifier transmitter 102. Once the windowing filter is loaded into the digital receiver 116, the radar system 100 can be operated immediately to produce data in realtime. Preferably, the windowing filter is loaded automatically.

Furthermore, the waveform design utility 118a provides the user with the ability to adjust the slope of the frequency modulation at distinct times of the pulse and to shape the amplitude tapering on the edges of the pulse. Given constraints on parameters input by the user, the waveform design utility 118a then practices an algorithm that searches the constrained waveform space and provides the waveform and windowed filter, given these constraints, that best minimizes the values of ISL and PSL by a logarithmic addition of these two quantities.

Preferably, the waveform design utility 118a adds pre-emphasis to the waveform in order to negate distortions caused when the transmitter 102 amplifies the waveform for transmission. As a result, the radar system 100 substantially preserves the properties of the waveform to insure that the range time sidelobe suppression actually functions as theoretically expected.

Figure 3:
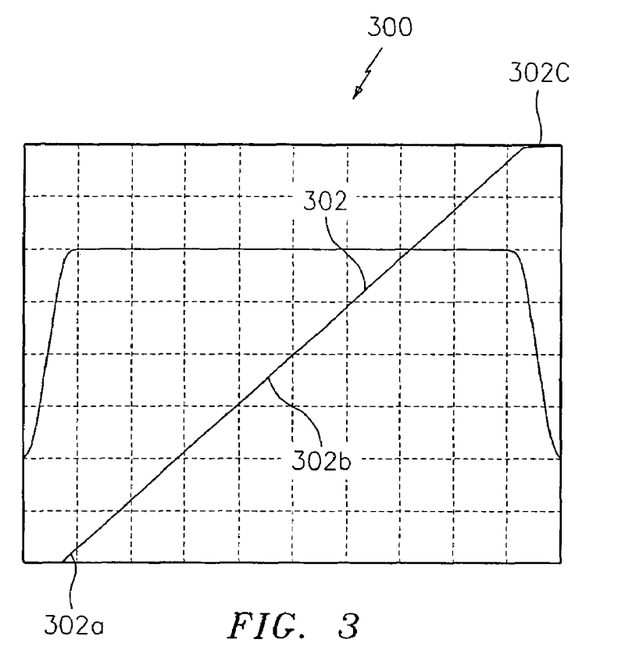
FIG. 3 is graphical illustration of waveform frequency modulation and amplitude shaping in accordance with the subject disclosure.

Referring now to FIG. 3, a graphic 300 illustrates frequency modulation and pulse shaping based on user input parameters as performed by the waveform design utility 118a. The line starting from the lower left and terminating at the upper right depicts the frequency of the waveform with the X-axis being time and the Y-axis being frequency. In this case, the waveform first increases slowly in frequency, then after approximately 10% of the time, the increase becomes more rapid in frequency, and finally in the last approximately 10% of the time, it again increases slowly in frequency. The line starting from the central part of the left side of the screen and terminating on the central part of the right side of the screen depicts the amplitude shaping of the waveform. For example, shaping a cosine shaped rise and fall of the waveform coincident with the slow frequency increase times and a flat shape coincident with the fast frequency increase time are shown.

Figure 4:
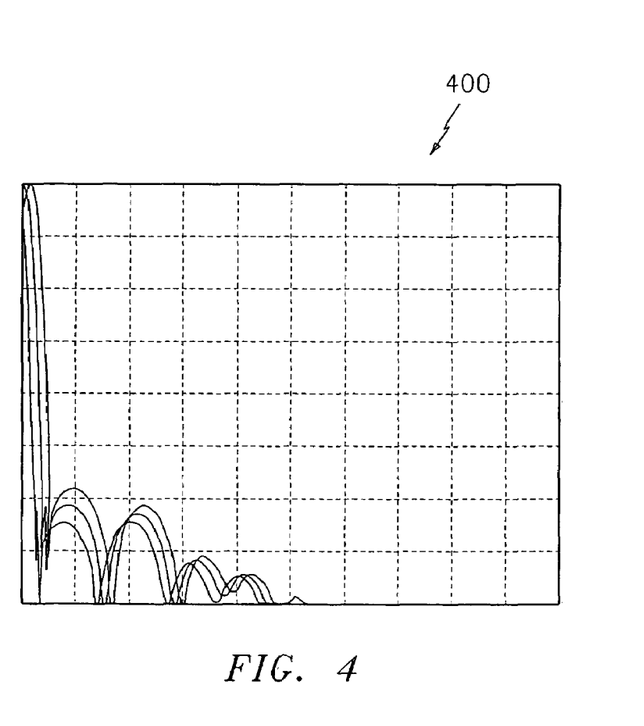
FIG. 4 is a waveform ambiguity plot showing sidelobe suppression in accordance with the subject technology.

The signal processor 118 also includes a graphical user interface or GUI utility 118c that shows the user the frequency and amplitude characteristics of the waveform and filter on the computer 130. Preferably, the GUI utility 118c shows an ambiguity plot (i.e., range time sidelobes levels) of the waveform over a range of Doppler velocities expected of meteorological targets. The results of user input are displayed in realtime to expedite and make practical the analysis of the waveforms and filters. FIG. 4 shows an ambiguity plot 400 for targets of max negative Doppler, zero Doppler and max positive Doppler (e.g., three waveforms).

Still referring to FIG. 2, the signal processor 118 preferably has a reporting utility 118d that generates statistics related to the peak sidelobes for presentation to the user via the computer 130. Such statistics include the integrated sidelobes and the SNR loss associated with the transmission and reception of the waveform.

Pulse Compression

The flow charts herein illustrate the structure or the logic of the present technology, possibly as embodied in an instruction set for implementation and execution on the system 100 and the like. Those skilled in the art will appreciate that the flow charts illustrate the structures of the instruction set, including hardwares such as logic circuits on an integrated circuit, that function according to the present technology. As such, the present invention is practiced in its essential embodiments by machine components that execute the instruction set to perform a sequence of function steps corresponding to those shown in the exemplary flow charts and/or as claimed.

In brief overview, to overcome the drawbacks associated with large range time sidelobes, the system 100 uses pulse modulation techniques, such as frequency modulation and/or amplitude shaping, to bring down the range time sidelobes to acceptable levels for targets moving at Doppler velocities as measured by meteorological radar, i.e., a high Doppler tolerance of the waveforms.

Figure 5:
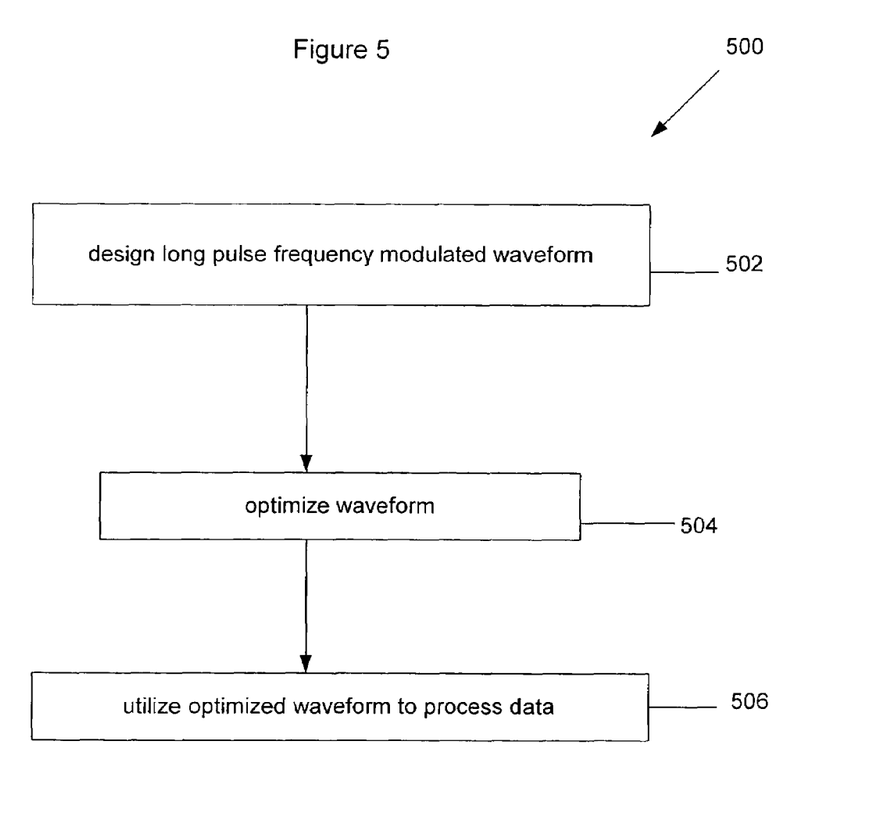
FIG. 5 is a flow diagram of a process performed by the system of FIG. 1 in accordance with the subject technology.

Referring to FIG. 5, there is illustrated a flowchart 500 depicting a process for using pulse compression in the system 100 in accordance with an embodiment of the present invention. Pulse compression allows for transmission of long pulses using frequency modulation, and employs a specially designed digital filter on receive that "compresses" the pulse in time resulting in fine range resolution as expected with a short pulse. At the same time as achieving this fine range resolution, the long pulses of the system 100 provide for much improved sensitivity when compared to using simple short pulses. In summary, pulse compression gives the range resolution of short pulses, but the greater sensitivity of long pulses.

Pulse compression is convenient to use on radars that support transmission of long pulses. Generally, the peak power output of a transmitter 102a is small compared to a magnetron (typically 10 kW as compared to 250 kW or more). However, a TWT transmitter 102a supports a much higher duty cycle (often 4% or greater). Thus by transmitting long pulses, the high duty cycle of a TWT transmitter 102a is exploited. Without pulse compression, the transmission of such long pulses would yield poor quality data, as the range resolution would be so coarse that echoes and clutter would blur together into an irresolvable image. With pulse compression, the range resolution is fine and the sensitivity is great, thus individual echoes and clutter are resolvable and weak signals are detectable.

An undesirable side effect of pulse compression is the creation of range/time side lobes. In a radar image, the range/time side lobes are observed as ghost echoes in range prior to and after real echoes. Through the various techniques described herein, the range/time side lobes are suppressed by techniques using appropriate waveform modulation and appropriate windowing of the received filter.

At step 502, the signal processor 118 of the system 100 designs an appropriate long pulse frequency modulated waveform. The signal processor 118 utilizes a digital waveform generation card (not shown). The RVP8/TX card available from Sigmet, a part of Vaisala Group in Westford, Mass., is an example of an acceptable digital waveform generation card. The digital waveform generation card generates the waveform digitally from sets of coefficients and performs a D/A conversion to output the modulated waveform at the radar IF (nominally 60 MHz). This waveform is up-converted to the radar RF (nominally 2700 MHz or 5600 MHz) and is sent to the linear amplifier for transmission. Preferably, the up-conversion is accomplished through a Single Side Band Mixer external to the signal processor 118.

Referring again to FIG. 3, the GUI 118c of the signal processor 118 provides a display 300 to the user to aid in the design of the waveforms. The sloping line 302 depicts the frequency of the waveform over time. In this case, a Non Linear FM (NLFM) pulse is chosen. At the beginning 302a (e.g., the left side), the frequency is increased slowly, then for the bulk 302b of the pulse, the frequency is increased linearly and at the end 302c, the increase is again slow. Also, as shown by the Gaussian shaped line 304, amplitude tapering is employed giving the pulse "rounded" edges. For example, a cosine squared function is employed. This amplitude tapering greatly improves characteristics such as range/time side lobes and keeps the frequencies confined to a narrower band.

At step 504, the various aspects of frequency modulation and amplitude tapering as well as the pulse length and the pulse bandwidth are all adjustable using the GUI 118c of the signal processor 118. The GUI utility allows the user to make various tradeoffs when designing a waveform. For example, more bandwidth can be applied to further compress the pulse (obtaining finer range resolution) at the tradeoff of requiring a larger frequency allocation. Other tradeoffs can be made such as increasing the length of the pulse to obtain better sensitivity as the tradeoff of needing to lower the radar PRF thus reducing the overall measurement accuracy. Tradeoffs are immediately realized with such a realtime GUI 118c. And as adjustments are made, the signal processor 118 immediately prints the expected peak and integrated side lobe suppression of the current waveform. This allows users to choose a waveform of known characteristics quickly and without doing manual detailed analysis. At step 506, the system 100 uses the optimized waveform to process weather data.

Figure 6:
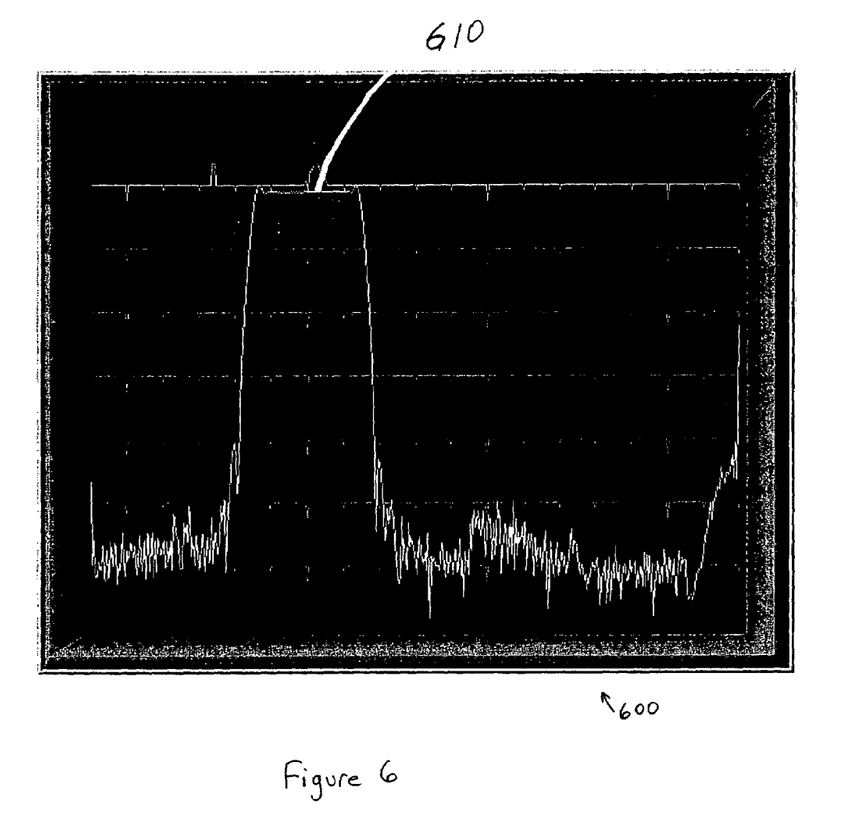
FIG. 6 is a frequency domain plot of a NLFM pulse with 3 MHz of frequency modulation in accordance with the subject technology.
Figure 7:
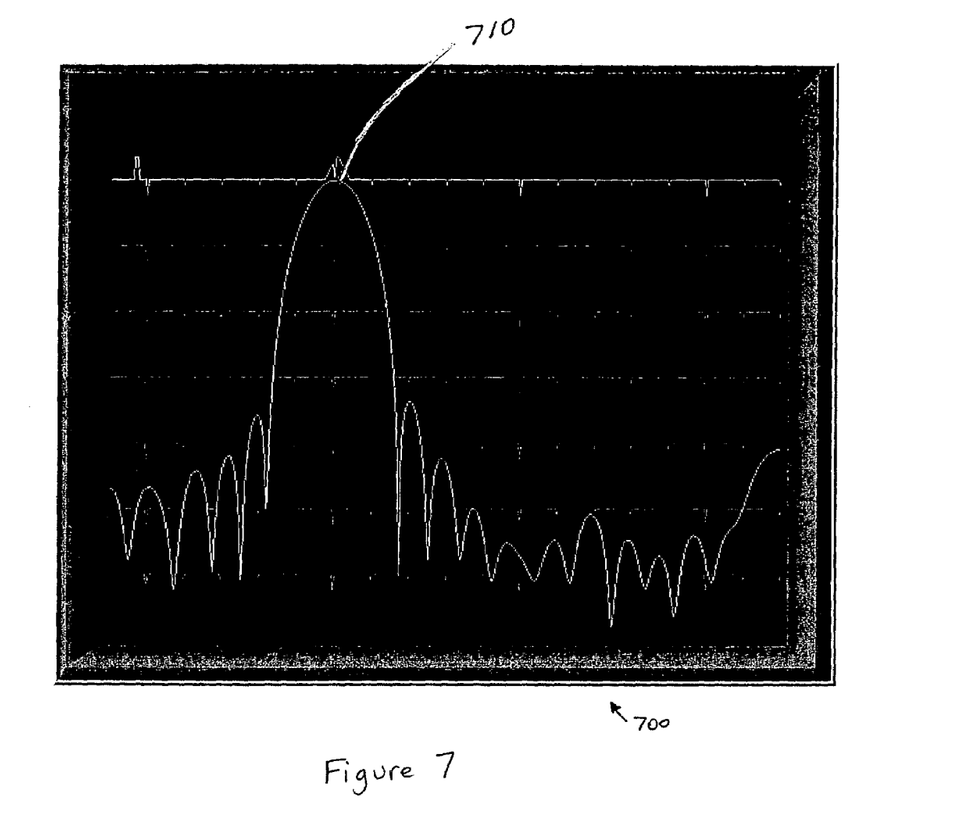
FIG. 7 is a frequency domain plot of another pulse in accordance with the subject technology.

Referring to FIGS. 6 and 7, the signal processor 118 also features a spectrum analysis function that shows the actual spectral properties of a given waveform. FIG. 6 shows a frequency domain plot 600 of a 40 microsecond NLFM pulse 610 with 3 MHz of frequency modulation. The pulse 600 is the result of what is depicted in the time domain plot of FIG. 3. FIG. 7 is the frequency domain plot 700 of a 1 microsecond simple pulse 710.

FIGS. 6 and 7 show the output of the linear amplifier after the output has been down-converted to 60 MHz IF and fed into the digitizer of the signal processor 118. In each case the plot extends from 54 MHz on the left to 72 MHz on the right. The center of both pulses 610, 710 is at 60 MHz. Note that the NLFM compressed pulse has a very concentrated and flat use of power over 3 MHz of bandwidth while the short non-compressed (non-modulated or just "simple") pulse has a tighter peak of power at the center frequency, but more distinct frequency side lobes.

Figure 8:
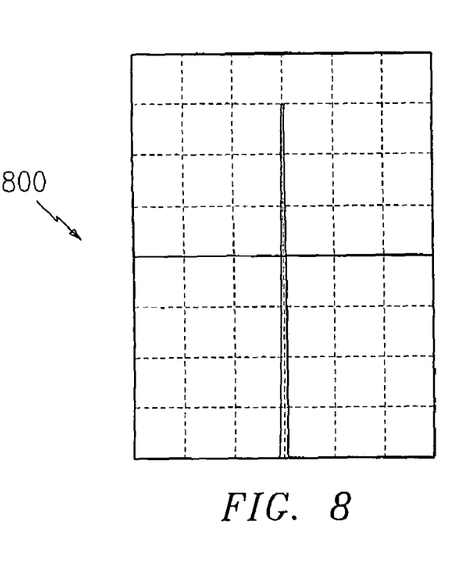
FIGS. 8-10 are respective time domain plots of a down-converted TWT output as measured at the signal processor in accordance with the subject technology.
Figure 9:
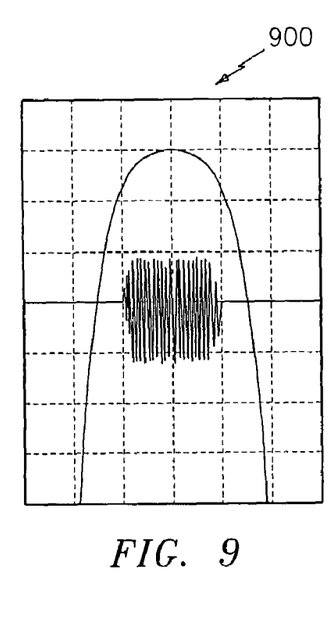
Figure 10:
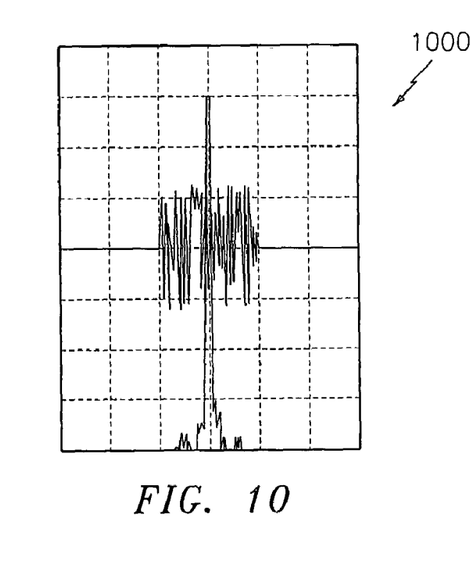

Referring now to FIGS. 8-10, respective time domain plots 800, 900, 1000 of the down-converted TWT output as measured at the signal processor 118. Each plot 800, 900, 1000 shows the raw received signal vertically centered, and the processed receive signal extending up from the bottom axis. In each case, the x-axis division between lines is 20 microseconds and the y-axis divisions are 10 dB.

FIG. 8 is generated from a 1 microsecond simple pulse 810. The raw signal and processed signal are the same length (e.g., 1 microsecond). FIG. 9 shows a 40 microsecond simple pulse. In this case, the peak energy is spread over the full length of the pulse. FIG. 10 is a same 40 microsecond NLFM pulse. In this case, the pulse is compressed by a factor of 120 (time-bandwidth product) to about 0.33 microseconds providing a range resolution of about 50 meters. In these examples, the Range/Time side lobes are suppressed more than 60 dB as depicted.

While the invention has been described with respect to preferred embodiments, those skilled in the art will readily appreciate that various changes and/or modifications can be made to the invention without departing from the spirit or scope of the invention as defined by the appended claims.

What is claimed is:

1. A method for processing data related to weather phenomena in a meteorological radar system, the method comprising the steps of:
   receiving an echo signal from weather phenomena generated by transmitting a long pulse; and
   employing a mismatched windowed filter on the echo signal such that the echo signal is compressed in time to achieve fine range resolution without substantially degrading sensitivity and while achieving low range time side lobes for Doppler velocities expected to be measured by the meteorological radar system.

2. A method for processing data related to weather phenomena in a meteorological radar system having an antenna connected to a transmitter, wherein the transmitter is connected to a signal processor, which is connected to a receiver, the method comprising the steps of:
   generating long pulses at IF in the signal processor with amplitude shaping and frequency modulation;
   using an exciter to up convert said long pulses to RF;

using a linear power amplifier style transmitter in the signal processor to produce high power output from the low power input from the exciter;

radiating said pulses into space;

receiving echoes from weather phenomena using the antenna; and employing a mismatched windowed filter on the echoes such that the echoes are compressed in time to achieve fine range resolution without substantially degrading sensitivity and while achieving low range time side lobes for Doppler velocities expected to be measured by the meteorological radar system.

3. A method as recited in claim 2, wherein the long pulses are modulated in frequency to achieve a Bandwidth Time product approximately between 100 and 200.

4. A method as recited in claim 3, further comprising the step of employing amplitude tapering to the long pulses to further reduce range time sidelobes.

5. A method as recited in claim 4, further comprising the step of employing a mismatched filter in the receiver.

6. A method as recited in claim 1, further comprising a utility as an integral part of the signal processor for allowing a user to input relevant parameters such as pulse width, bandwidth, modulation parameters and pulse shaping parameters.

7. A method as recited in claim 6, wherein the utility graphically shows plots of waveform frequency, amplitude, an ambiguity.

8. A method as recited in claim 6, wherein the utility practices in realtime an algorithm that searches a constrained waveform space and provides a waveform and mismatched window and then automatically installs said waveform and filter in signal processor for immediate use.

9. A method as recited in claim 1, further comprising the step of pre-emphasizing the long pulses to negate distortions caused when the transmitter amplifies the long pulses for transmission.

10. A radar system comprising:
an antenna;
a transmitter for providing a pulse signal to the antenna;
a signal processor having a waveform design utility that:
accepts input criteria from a user such as desired pulse width, bandwidth, modulation and shaping to create the pulse signal from a constrained space of pulse signals; and practices in realtime an algorithm that searches a constrained waveform space and provides a waveform and mismatched window and then automatically installs said waveform and filter in signal processor for immediate use; and
a receiver connected to the signal processor.

11. A radar system as recited in claim 10, wherein the receiver has a low noise, high dynamic range linear design RF portion with a down conversion stage to eliminate a need for gain control circuitry.

12. A radar system as recited in claim 10, wherein the receiver has at least one frequency synthesizer that uses a phase lock loop (PLL) to produce RF by multiplying up a base oscillator to create a signal that is connected directly to the signal processor so that a trigger and sampling timing is synchronous to enhance coherency of the system and, thus, further minimize phase noise.

13. A radar system as recited in claim 10, wherein the pulse signal is a Non Linear FM (NLFM) pulse signal.

14. A radar system as recited in claim 10, wherein the signal processor outputs a pulsed IF signal that is ultimately up converted to RF by the receiver and radiated by the transmitter.

15. A radar system as recited in claim 10, wherein the waveform design utility computes an optimal waveform and windowing filter to meet the user criteria while minimizing PSL and ISL value, providing Doppler tolerance, fine range resolution and high sensitivity.

16. A radar system as recited in claim 15, wherein the waveform design utility allows the user to make tradeoffs between bandwidth and frequency allocation.

17. A radar system as recited in claim 15, wherein the waveform design utility allows the user to make a tradeoff between lengths of the short pulse to obtain better sensitivity.

18. A radar system as recited in claim 10, wherein the waveform design utility provides the user with the ability to adjust the slope of the modulation at distinct times of the pulse signal and to shape an amplitude tapering on edges of the pulse.

19. A radar system as recited in claim 18, wherein the waveform design utility practices an algorithm that searches the constrained space and provides a waveform and windowed filter that best minimizes values of ISL and PSL by a logarithmic addition of ISL and PSL.

20. A radar system comprising:
an antenna;
a transmitter for providing a pulse signal to the antenna;
a signal processor having a waveform design utility that:
accepts input criteria from a user such as desired pulse width, bandwidth, modulation and shaping to create the pulse signal from a constrained space of pulse signals; and computes an optimal waveform and windowing filter to meet the user criteria while minimizing PSL and ISL value, providing Doppler tolerance, fine range resolution and high sensitivity; and
a receiver connected to the signal processor.

21. A radar system comprising:
an antenna;
a transmitter for providing a pulse signal to the antenna;
a signal processor having a waveform design utility that:
accepts input criteria from a user such as desired pulse width, bandwidth, modulation and shaping to create the pulse signal from a constrained space of pulse signals; and provides the user with the ability to adjust the slope of the modulation at distinct times of the pulse signal and to shape an amplitude tapering on edges of the pulse; and
a receiver connected to the signal processor.

* * * * *